United States Patent [19]
Kato

[11] Patent Number: 6,114,057
[45] Date of Patent: Sep. 5, 2000

[54] MAGNETIC RECORDING MEDIUM

[75] Inventor: Atsushi Kato, Miyagi, Japan

[73] Assignee: Sony Corporation, Tokyo, Japan

[21] Appl. No.: 09/033,604

[22] Filed: Mar. 3, 1998

[30] Foreign Application Priority Data

Mar. 4, 1997 [JP] Japan ..................... 9-048985

[51] Int. Cl.⁷ .................. G11B 5/66; G11B 5/70
[52] U.S. Cl. ................ 428/694 B; 428/694 BU; 428/694 BL
[58] Field of Search ................... 428/688, 689, 428/692, 694 ML, 694 SC, 423.1, 694 BU, 694 BL, 694 B, 323

[56] References Cited

U.S. PATENT DOCUMENTS

| | | | |
|---|---|---|---|
| 4,788,103 | 11/1988 | Okita et al. | 428/425.9 |
| 5,089,344 | 2/1992 | Tamazaki et al. | 428/425.9 |
| 5,124,424 | 6/1992 | Endo et al. | 528/48 |
| 5,536,567 | 7/1996 | Kato et al. | 428/323 |
| 5,556,698 | 9/1996 | Amirsakis et al. | 428/323 |
| 5,702,821 | 12/1997 | Murayama et al. | 428/425.9 |
| 5,908,691 | 6/1999 | Murayama et al. | 428/323 |

FOREIGN PATENT DOCUMENTS 0 735 524 A2  10/1996  European Pat. Off. .

*Primary Examiner*—Paul Thibodeau
*Assistant Examiner*—Sheeba Ahmed
*Attorney, Agent, or Firm*—Hill & Simpson

[57] ABSTRACT

The present invention provides a magnetic recording medium aimed at improving performance of magnetic recording medium such as videotapes, audiotapes, computer tapes, etc., including electromagnetic transducing characteristic and durability. The magnetic recording medium is coated with a magnetic coating as a dispersion of magnetic micropowder and binders in a solvent over a non-magnetic support. Polyester polyurethane resins having a certain alicyclic skeleton and containing tertiary amines or quaternary ammonium salts are used as the binders.

3 Claims, No Drawings

MAGNETIC RECORDING MEDIUM

BACKGROUND OF THE INVENTION

1. Field of the Invention

The present invention relates to a magnetic recording medium, particularly a magnetic recording medium obtained by coating magnetic coating as the dispersion of magnetic particulates and binder in the solvent over non-magnetic support. More specifically, the invention relates to a magnetic recording medium used for videotapes, audiotapes, floppy disks, data storage tapes for computers, whose electromagnetic transducing characteristic and durability are improved.

2. Description of the Related Art

Recently, with increasing performance of high vision VTR, digital VTR, etc., improvement in the characteristics of a magnetic recording medium has been demanded. Therefore, developments of evaporation-type magnetic recording medium which can provide electromagnetic transducing characteristic with higher output than coat-type one are more actively carried out.

However, evaporation-type magnetic recording medium have high surface energy on the magnetic surface, causing a problem of deterioration of durability due to friction, because they are formed by evaporating magnetic metals such as iron, cobalt and nickel on non-magnetic support under vacuum.

Moreover, evaporation process needs complicated, expensive equipments such as vacuum system and laser to evaporate metals and the productivity is low as compared with the other coat-type magnetic recording medium.

Thereby, developments of high performance coat-type magnetic recording medium have been actively studied. Recently, reduction of the size of magnetic powder used has been attempted because shortening recording wavelengths is promoted.

Under these circumstances, it is important to develop a binder resin to contain these more recently developed high performance particulates in a magnetic recording medium which combines the features of dispersibilty and durability.

Conventionally, common resins as binders for magnetic recording include vinyl chloride copolymers, polyurethane resin, cellulose resin (Japanese Patent Laid-Open No. 5-319777), phenoxy resin, polyacetal resin (Japanese Patent Laid-Open No. 5-329318) and are used alone or in combination.

Out of these resins, polyurethane resin has been variously studied so far because it has a wide range of properties and various functional groups can be introduced. Furthermore, in order to obtain high performance magnetic recording medium, improvement in solubility of various resin components and lowering of viscosities of resins allowing high dispersion of solid components are necessary.

For example, Japanese Patent Laid-Open No. 7-235044 disclosed that excellent characteristics of electromagnetic transduction is available by using the polyurethane resin with tertiary amine as polar group. Moreover, because reduction of the size of magnetic powder used has been attempted in recent years, low viscosity and dispersion of hard solid components are demanded. Therefore, for example, Japanese Patent Laid-Open No. 3-190983, Japanese Patent Laid-Open No. 3-203811 disclosed the method using the polyurethane resin of a certain composition into which alkylphosphine group is introduced.

Similarly, as the binder effective in dispersibility, Japanese Patent Laid-Open No. 7-50010 disclosed urethane urea using a given amine, which has been variously studied so far.

However, since every binder which has been studied so far contains large amounts of polar groups to improve the dispersibility, it is known that the viscosity of binder resins increases and the resin is hard to handle during manufacture, and resultantly sufficient effect frequently was not achieved.

Also concerning resin viscosity, such resins can not be well mixed with several binders and the thixotropy of a magnetic coating increases, so that high speed coating could not be performed with low productivity.

SUMMARY OF THE INVENTION

An object of the present invention is to correct disadvantages of the prior art and to supply a magnetic recording medium which provides improvements in videotapes, audiotapes, computer tapes, etc., including the characteristics of electromagnetic transduction and durability.

To attain the purpose, the present invention supplies a magnetic recording medium obtained by coating magnetic coating as dispersion of magnetic micropowder and a binder in the solvent over non-magnetic support, wherein the binder has alicyclic skelton shown in the following chemical formula (1) and is polyurethane resin containing tertiary amines or quaternary ammonium salts:

Chemical formula (1)

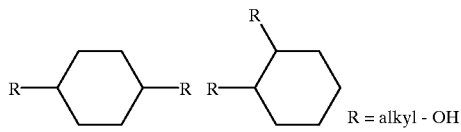

In such a structure, the cyclohexane skeleton, comprising a six-member ring alicyclic compound, is sterically rigid, because it is stabilized due to steric hinderance by changing to certain configurations, such as the thermodynamically stable chair-type configuration and the boat or twisted-boat configuration. bonds alone, resulting to be chemically stable as compared with ether bonds or ester bonds.

By using the polyurethane resin having such a certain structure of alicyclic skeleton, chemical stabilization is attained and, handling can be improved and improvements in the electromagnetic transducing characteristic can be obtained with no problems of excessive increase in binder viscosity, etc. even when introducing polar groups to increase dispersibility and improve the electromagnetic transducing characteristic.

Furthermore, polymer resin with cyclohexane skeleton generally becomes hard and stiff by increasing its glass-transition temperature (Tg) due to such a sterically rigid structure. This prevents deterioration due to regional temperature elevation of tapes caused by friction and improves the durability when constructing the magnetic recording medium such as magnetic tapes.

DESCRIPTION OF THE PREFERRED EMBODIMENTS

First of all, polyester resins are described as material of polyurethane resins used in the present invention.

Polyester resins are resin compounds obtained by dehydration and condensation of dicarboxylic acid and glycol by esterification. In general, both ends of an ester become the reaction points for subsequent urethane reaction as hydroxyl groups.

In the present invention, a dicarboxylic acid such as phthalic acid, adipic acid, etc. is used as acid component and aliphatic glycol shown by the chemical formula (1) is used as glycol component.

The glycol component shown by this chemical formula (1) include 1,4- or 1,3-substituents of cyclohexane, for example, cyclohexane-1,4-dimethanol (1,4-CHDM), cyclohexane-1,3-dimethanol, etc.

Herein, 1,4-substituents of cyclohexane are effective in the durability because of higher Tg of resin as compared with the other substituents. On the other hand, 1,3-substituents have lower Tgs because of bent resin skeleton and tend to have lower resin viscosities.

Herein, the glycol components having cyclohexane skeleton as this 6-member ring alicyclic compounds are poorly soluble in ketone and toluene type organic solvents, which limits the amount to be introduced into polyester.

Thus, in the polyesters as material of the polyurethane resin used in the present invention, the molar ratio of glycol components shown by the chemical formula (1) is preferable to be 0.8 or less. The polyesters obtained at the ratio of 0.8 or more are slightly soluble, causing evils that subsequent urethane reaction is impossible.

The above-mentioned indicates that the composition of polyesters as the material used in the present invention are preferably 0.8 to 0.1 for alicyclic glycols, more preferably 0.6 to 0.3, in terms of composition ratio when defining an acid component such as phthalic acid, adipic acid, etc. as 1 mole. The higher the ratio is, the higher the resin Tg is, and the resin becomes difficult to plasticize but, on the other hand, the solubility decreases. Inversely, at lower ratio, satisfactory characteristics by addition of alicyclic glycols can not be obtained.

In the present invention, as glycol components combined with alicyclic glycols, well-known compounds can be used. For example, they include ethylene glycol, 1,3-propylene glycol, 1,2-propylene glycol (hereafter abbreviated as 1,2 PG), 1,4-butylene glycol (hereafter abbreviated as 1,4-BG), 1,5-pentane glycol, 2-butyl-2-ethyl-1,3-propane diol, neopentyl glycol (hereafter abbreviated as NPG), 1,8-octane glycol, 1,9-nonane diol, diethylene glycol, cyclohexane-1, 4-diol, cyclohexane-1,4-dimethanol, dimer-acid diol, trimethylol propane (hereafter abbreviated as TMP), glycerin, hexane triol, other glycols and triols, etc.

Moreover, as the polyesters used in the present invention, phthalic acid-polyesters (phthalates) are effective. In the presence of benzene rings, phthalates have rigid molecular structures as compared with adipates and resin Tg increases, which is effective in the durability of final magnetic recording medium. In addition, dicarboxylic acids used may include, for example, dicarboxylic acids such as succinic acid, adipic acid (hereafter abbreviated as AA), sebacic acid and azelaic acid or acid esters or acid anhydrides thereof except for phthalic acid derivatives such as terephthalic acid (hereafter abbreviated as TP), isophthalic acid (hereafter abbreviated as IP), orthohpthalic acid, etc.

The hydroxyl value of a polyester is total hydroxyl equivalent per unit weight and is expressed as the equivalent of KOH (potassium hydroxide) in unit of KOH mg/g. The molecular weight of a polyester is calculated from this hydroxyl value as the polyester with hydroxyl groups on both ends.

In the present invention, the hydroxyl value of a polyester is preferably 10 to 500 KOH mg/g, more preferably 50 to 300 KOH mg/g. At lower hydroxyl value, the molecular weight of the polyester increases, leading to slightly undesirable events including difficulty in synthesis of the polyester itself, decreases in introducing amount of urethane group after forming urethane, decreases in network by intermolecular hydrogen bonds and decreases in stiffness and agglutination of polyurethane resin layers.

On the contrary, at too high hydroxyl value, polyurethane resins tend to be hardened. This hydroxyl value of the polyester should be appropriately chosen depending on usage and, it is desirable to use the ones with higher hydroxyl values and more intramolecular bridging points with hardening agents to increase heat-resistance and agglutinating energy.

Then, the polyurethane resins used in the present invention are described.

A polyurethane resin is resin compound consisting of active hydrogen compound and diisocyanate, and active hydrogen compounds used in the present invention are composed of polyesters consisting of glycols posessing alicyclic skeleton shown by the chemical formula (1) and dicarboxylic acids and water or glycols with a molecular weight of 62 to 250. Moreover, as source of polar groups, it contains the polyester containing tertiary amines or quaternary ammonium salts or single molecular glycol containing tertiary amine or quarternary ammonium salt.

As water or glycol component with a molecular weight of 62 to 250, low molecular polyol mentioned as the material of the polyester, i.e., water, ethylene glycol (EG), 1,3-propylene glycol (PG), 1,2-PG, 1,4-butane diol (BG), 1,5-pentane glycol, 1,6-hexane diol (HG), 3-methyl-1,5-pentane glycol, neopentyl glycol, 1,8-octane glycol, 1,9-nonane diol, diethylene glycol, cyclohexane-1,4-diol, cyclohexane-1,4-dimethanol, dimer-acid diol, TMP, glycerin, hexane triol, quadolol or ethylene oxide or propylene oxide adduct of bisphenol A can be used.

The diisocyanate compounds include aromatic diisocyanates, for example, 2,4-toluene diisocyanate (hereafter abbreviated as 2,4-TDI), 2,6-toluene diisocyanate (hereafter abbreviated as 2,6-TDI), xylene-1,4-diisocyanate, xylene-1,3-diisocyanate, 4,4'-diphenylmethane diisocyanate (hereafter abbreviated as MDI), 2,4'-diphenylmethane diisocyanate, 4,4'-diphenyleter diisocyanate, 2-nitrodiphenyl-4,4'-diisocyanate, 2,2'-diphenylpropane-4, 4'-diisocyanate, 3,3'-dimethylphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate and 3,3'-dimethoxydiphenyl-4,4'-diisocyanate, aliphatic diisocyanates such as tetramethylene diisocyanate, hexamethylene diisocyanate (hereafter abbreviated as HDI) and lysine diisocyanate, alicyclic diisocyanates such as isophorone diisocyanate (hereafter abbreviated as IPDI), hydrogenated trilene diisocyanate, hydrogenated xylene diisocyanate, hydrogenated diphenylmethane diisocyanate and tetramethylxylene diisocyanate.

Polar groups can be easily introduced by urethane reaction of the polymer component as material, which is obtained by ester exchange between the polyester such as butylene adipate and tertiary amine- or quarternary ammonium salt-contained glycol or by addition of several moles of caprolactone, etc. to active hydrogen in tertiary amine- or quarternary ammonium salt-contained glycol or amine.

Furthermore, more generally, there is also a method to directly introduce into polyurethane resin by urethane reaction using polar group-contained glycol compound and polar group-contained aminoalcohol compound or polar group-contained diamine compound as chain propagating agent.

The tertiary amines used as polar group-contained active hydrogen compounds are aliphatic amines, aromatic amines, alcanol amines, alcoxyalkyl amines, etc. More concretely, they include N-methyldiethanol amine (NMDEA), N-methyldiisopropyl amine (NMDPA), diethylaminopropane diol (DEAPD), N-(2-aminoethyl) ethanol amine, N-methylethanol amine, diisopropyl amine, piperazine, 2-methyl-piperazine, (hyderoxyethyl)piperazine, bis(aminopropyl)piperazine, N-methyl aniline, N-methylphenyl amine, etc.

Moreover, in the case of quaternary ammonium salts, the method to introduce as ammonium salt from the beginning and the method to introduce as tertiary amine into polyurethane resin and subsequently change it to quaternary one with alkylating agent, both of which are used as effective methods from the standpoint of synthetic procedure.

The quarternary ammonium salts include aliphatic amine salts and quarternary ammonium salts and thereof, aromatic quarternary ammonium salts, heterocyclic quarternary ammonium salts, etc., counterions may be halogen elements such as choline, bromine, iodine, etc. and organic acids such as carboxylic acids, phosphoric acids, etc other than halogen elements. Generally, use of quaternary ammonium salts as polar groups and halogens as counter ions may cause rust on storage containers like petroleum cans.

More concretely, as the agents to change tertiary amines to quaternary ammoniums, alkylating agents such as methyl iodide, ethyl iodide, ethyl bromide, p-toluenesulfonyl chloride and ethyl p-toluenesulfonate, phosphate triesters, orthoacetate esters, chlorocarbonate esters such as chlorocarbonate methyl ester, chlorocarbonate ethyl ester, chlorocatbonate n-propyl ester, chlorocarbonate isopropyl ester and chlorocarbonate 2-ethoxyethyl ester, halomethane carboxylic acids such as monochloroacetic acid and trifluoroacetic acid and esters thereof and phosphate triesters, etc. are available.

The amount of a polar group of tertiary amine and quarternary ammonium salt in the present invention ranges 0.001 mmol/g to 1.0 mmol/g, preferably 0.01 mmol/g to 0.5 mmol/g. When the amount of a polar group exceeds the values, the dispersibility of coating improves but coating porperty is worsened, leading to a tendency that streaks are liable to occur. When the amount is less, the dispersibility of the coating is worsened.

Next, manufacture of polyurethane resins is detailedly described.

Synthetic methods of polyurethane include solution synthesis to make active hydrogen compound as material of urethane and diisocyanate react in appropriate organic solvent and solid synthesis to directly mix and react materials without use of organic solvent.

Concretely, solution synthesis reacts polyester polyols as material of urethane, water or active hydrogen compound such as a glycol with a molecular weight of 62 to 250, and diisocyanate compound in an organic solvent which dissolves these compounds. Furthermore, solid synthesis directly reacts the active hydrogen compound and diisocyanate by mixing in an extruder or kneader to obtain solid polyurethane resin.

The polyurethane resin in the invention is obtained by reacting the diisocyanate component and active hydrogen compound component like foregoing polyesters under excessive active hydrogen condition that the equivalent ratio of an active hydrogen group in an active hydrogen compound component to isocyanate exceeds 1.0.

This excessive active hydrogen condition is necessary to contain active hydrogen group without isocyanate being residual in manufactured polyurethane precursor, and the equivalent ratio of an active hydrogen group in an active hydrogen compound component to isocyanate in diisocyanate component is preferably 1.0 to 2.0. It is important to determine the condition causing no gelation on manufacturing polyurethane precursor by average functional group number of isocyanate groups and average functional group number of active hydrogen compound component during introduction of trial and perform formulation to meet the condition.

Although that formulation ratio comforms to the gelation theory that J. P. Flory, Khum et al have theoretically calculated, actually polyurethane precursor can be manufactured by reacting at the formulation ratio considering reactivity ratio of reacting groups contained in the active hydrogen compound and each isocyanate molecule without forming gel.

The polyurethane components in the invention can be manufactured by uniformly mixing and reacting each component under the condition for formulation in melting and bulk states according to previously mentioned soild synthesis.

As for reaction equipments, any equipment can be used to achieve the homogenous reaction and, for example, mixing and kneading equipments such as reacting vessel with stirrer, kneader and uniaxial or multiaxial extruding reacter are listed. To accelerate the reaction, metal catalysits and amine catalysts routinely used in manufacture of polyurethane are also available.

The polyurethane resins used have the number average molecular weights ranging 5,000 to 40,000, preferably 10,000 to 30,000, more preferably 15,000 to 25,000. Higher number average molecular weight increases the viscosity of resin solution, resulting in difficult handling.

Then, the composition of magnetic recording medium in the invention is described.

As ferromagnetic powder used in the invention, well-known ferromagnetic materials are available including γ-FeOx (x=1.33–1.5), Co-degenerated γ-FeOx (x=1.33–1.5), ferromagnetic alloy containing Fe, Ni or Co as main component (75% or more), barium ferrite, strontium ferrite, etc. can be used. Moreover, these ferromagnetic powder may contain atoms such as Al, Si, S, Sc, Ti, V, Cr, Cu, Y, Mo, Rh, Pd, Ag, Sn, Sb, Te, Ba, Ni, Ta, W, Re, Au, Hg, Pb, Bi, La, Ce, P, Mn, Zn, Co, Sr and B in addition to prescribed atoms.

In the present invention, more useful magnetic powder is ferromagnetic particulate metal powder and remarkable effect can be found at σs of 100 to 200 A m$^2$/kg, specific surface area by BET method of 45 to 60 m$^2$/g and magnetic resistance of 90 to 200 kA/m.

Otherwise, as the solvents used to adjust binders, abrasives, antistatic agents in the magnetic recording medium relating to the present invention, rust preventives or magnetic coatings other than non-magnetic support and ferromagnetic powder mixed into magnetic layer, any of conventionally well-known substances is applicable without any limitation.

For example, as the material of above-mentioned non-magnetic support, those routinely used for magnetic recording medium can be used, which include, for example, polyesters such as polyethylene terephthalate and polyetrhylene naphthalate, polyolefins such as polyethylene and polypropylene, cellulose derivatives such as cellulose triacetate, cellulose diacetate and cellulose acetate butylate, vinyl resins such as polyvinyl chloride and polyvinylidene chloride, polycarbonates, polyimides, polyamide imide, other plastics, metals such as aluminum and copper, light alloys such as aluminum alloy and titanium alloy, ceramics, monocrystal silicon, etc.

The amount added of the polyurethane concerned in the present invention is preferably 1 to 20 weight parts in terms of weight ratio of magnetic micropowder, more preferably 5 to 15 weight parts. In the case of less polyurethane resin, the adhesiveness to non-magnetic support is lower and the durability decreases. In the case of more polyurethane resin, the evils due to the adhesiveness are liable to occur in magnetic recording medium such as tapes during long-term storage. Therefore, the resin exhibiting favorable compatibility with the polyrethane resin concerned is combined.

As the other binders used in magnetic layer, well-known materials can be used. Namely, vinyl chloride-vinyl acetate copolymers, vinyl chloride-vinyl acetate-vinylalcohol copolymers, vinyl chloride- vinylidene copolymers, vinyl chloride-acrylonitrile copolymers, vinyl chloride-vinyl acetate-maleic acid copolymers, acrylate ester -vinylidene chloride copolymers, acrylate ester-acrylonitrile copolymers, methacrylate ester-styrene copolymers, thermoplastic polyurethane resin, phenoxy resin, polyvinyl fluoride, vinylidene chloride-acrylonitrile copolymers, butadiene-acrylonitrile copolymers, acrylonitrile-butadiene-methacrylic acid copolymers, polyvinyl butyral, cellulose derivatives, styrene-butadiene copolymers, polyester resin, phenol resin, epoxy resin, thermosetting polyurethane resin, urea resin, melamine resin, alkyd resin, urea-formaldehyde resin, polyvinyl acetal resin or mixtures thereof are listed.

Among them, polyurethane resins, polyester resins, acrylonitrile-butadiene copolymers, which possibly give the flexibility, and cellulose derivatives, phenol resins and epoxy resins, which possibly give the rigidity, are desirable. As the foregoing binders, those which improve the durability by bridging isocyanate compounds or into which appropriate polar groups are introduced may be chosen.

Hereupon, according circumstances, the layer (undercoat) containing the foregoing well-known binders as main components can be placed between non-magnetic suppot and the underlayer. As the carbon black used in magnetic layer, any carbon can be used. The kinds of carbon black include acetylene block, furnace black, etc. depending on manufacturing method.

Hereupon, those with DBP oil absorption of 30 to 150 ml/100 g, preferably 50 to 150 ml/100 g, the mean particle diameter of 5 to 150 nm, preferably 15 to 50 nm and the specific surface area by BET method of 40 to 300 m$^2$/g, preferably 100 to 250 m$^2$/g are effective. Moreover, it is preferable that the percentage of water content ranges 0.1 to 10%, the tap density ranges 0.1 to 1 g/cc and the pH ranges 2.0 to 10. The carbon black with more DBT oil absorption has higher viscosity and lower dispersibility. Even when DBP oil absorption is less, dispersion process needs more time because of lower dispersibility. When the mean particle size is smaller, more dispersion time is needed, but more favorable surface state is obtained. When the mean particle size increases, the surface state becomes worse. Thus, foregoing ranges are desirable.

As kind of carbon black meeting these conditions, RAVEN 1250 (particle size: 23 nm, BET value: 135.0 m$^2$/g, DBP oil absorption: 58.0 ml/100 g), 1255 (particle size: 23 nm, BET 125.0 m$^2$/g, DBP oil absorption: 58.0 ml/100 g), 1020 (particle size: 27 nm, BET: 95.0 m$^2$/g, DBP oil absorption: 60.0 ml/100 g), 1080 (particle size: 28 nm, BET: 78.0 m$^2$/g, DBP oil absorption: 65.0 ml/100 g), RAVEN 1035, RAVEN 1040, RAVEN 1060, RAVEN 3300, RAVEN 450, RAVEN 780, etc., which were manufactured by Colombian Carbon Co.,Ltd., or CONDUCTEX SC (particle size: 20 nm, BET 220.0 m$^2$/g, DBP oil absorption: 115.0 ml/100 g) can be used. In addition, Asahi Carbon's #80 (particle size: 23 nm, BET: 117.0 m$^2$/g, DBP oil absorption: 113.0 ml/100 g), Mitsubishi Kasei's #22B (particle size: 40 nm, BET: 5.0 m$^2$/g, DBP oil absorption: 131.0 ml/100 g) and #20B: (particle size: 40 nm, BET: 56.0 m$^2$/g, DBP oil absorption: 115.0 ml/100 g), Cabbot's BLACK PEARLS L (particle size: 24 nm, BET: 250.0 m$^2$/g, DBP oil absorption: 60.0 ml/100 g) BLACK PEARLS 800 (particle size: 17.0 nm, BET: 240.0 m$^2$/g, DBP oil absorption: 75.0 ml/100 g), BLACK PEARLs 1000, BLACK PEARLS 1100, BLACK PEARLS 700, BLACK PEARLS 905, etc. may be also chosen.

Also in the magnetic recording medium in the present invention, non-magnetic back-coat layer can be set on opposite side of magnetic layer of non-magnetic support. The thickness of back coat layer is 0.1 to 2.0 μm, preferably 0.3 to 1.0 μm, and well-known materials can be used.

As the lubricants in this invention, well-known ones can be used. For example, higher fatty acid esters, silicone oil, fatty acid denatured silicone, fluorine-contained silicone or the other fluorine lubricants, polyorefin, polyglycol, alkylphosphate esters and metal salts and mixture thereof, polyphenyl ethers, alkylether fluoride, amine lubricants such as amine salts of alkylcarboxylic acids and amine salts of fluoroalkylcarboxylic acids as well as alcohols with 12 to 24 carbons (each of which can be unsaturated or branched), higher fatty acids with 12 to 24 carbons, etc. can be used.

The higher fatty acid esters used in the present invention include higher fatty acid esters with 12 to 32 carbons (each of which can be unsaturated or branched), which are, for example, methyester, ethyl ester, propyl ester, isopropyl ester, butyl ester, pentyl ester, hexyl ester, heptyl ester, octyl ester, etc. of lauric acid, myristic acid, palmitic acid, stearic acid, isostearic acid, arachic acid, eicosane, elaidic acid, behenic acid, linoleic acid, linolenic acid, etc. Concrete names of compounds include butyl stearate, pentyl stearate, heptyl stearate, octyl stearate, isooctyl stearate, butoxyethyl stearate, octyl myristate, isooctyl myristatebutyl palmitate, etc. Moreover, lubricants can be mixed with multiple lubricants.

Main components of the abrasives used in the present invention are α-alumina, β-alumina, fused alumia, silicon carbide, chromium oxide, cerium oxide, α-iron oxide, corundum, diamond, silica rock, boron nitride, molybdenum carbide, boron carbide, tungsten carbide, titanium oxide, etc., of which well-known materials with the Moh's hardness of 6 or more are used alone or in combination.

The mean particle size of these abrasives is preferable to be 0.01 to 2 μm but abrasives can be used as a combination of those with different particle size and single abrasive can be used by widening the particle size distribution.

Similarly, as antistatic agents, well-known ones such as natural surfactants, nonionic surfactants, cationic surfactants, etc. can be used in addition to foregoing carbon black.

In the present invention, well-known coupling agents can be used. The coupling agents include silane coupling agents, titanate coupling agents, aluminum coupling agents, etc. Herein, the amount of a coupling agent added for 100 weight part of the magnetic particulates concerned is preferably 0.05 to 10.00 weight parts, more preferably 0.1 to 5.00 weight parts.

As silane coupling agents, vinyl silane compounds such as g-methacryloxypropyl-trimethoxy silane and vinyltriethoxy silane and epoxysilane compounds such as β-(3,4-epoxycyclohexyl)-ethyl-trimethoxysilane and γ-glycidoxy-propyl-trimethoxysilane and aminosilane compounds such as γ-amino-propyl-triethoxy silane and N-β (aminoethyl)γ-aminopropylmethyl-dimethoxysilane, and mercaptosilane compounds such as γ-ercaptopropyl-trimethoxy silane can be favorably used.

As the titanate coupling agents, tetra-n-butoxytitan, teraisopropoxytitan, bis[2-[(2-aminoethyl)amino]ethanolate][2-[(2-aminoethyl)amino)ethanolate-0](2-propanolate)titanium, tris(isooctadecanoate-0) (2-propanolate)titanium, bis(ditridecylphosphite-0")tetrakys (2-propanolate)dihydrogentitanate, bis(dioctylphosphite-0") tetrakys(2-propanolate)dihydrogentitanate, tris (dioctylphosphite-0") (2-propanolate)titanium, bis (dioctylphosphite-0") [1,2-ethanedioleate (2-)-0,0']titanium, tris(dodecylbenzensulfonate-0) (2-propanolate)titanium, tetrakys[2,2-bis[(2-propenyloxy)methyl]-1-butanolate, etc. are listed. As the products, PLAINACT KR, TTS, KR 46B, KR 55, KR 41B, KR 38S, KR 138S, KR 238S, 338X, KR 12, KR 44, KR 9SA, KR 34S, etc., manufactured by Ajinomoto Co.,Ltd., can be suitably used.

The aluminum coupling agents include acetoalcoxyaluminum diisopropylate, and, as the products, PLAINACT AL—M, etc. can be suitably used.

As the methods to adjust magnetic coating, any of well-known method can be used. For example, roll-mill, ball-mill, sand-mill, toron-mill, high speed stone-mill, busket-mill, disper, homomixer, kneader, continuous kneader, extruder, homogenizer, ultrasonic dispersion system, etc. can be used.

Before directly applying magnetic coating, undercoating with adhesives, etc. and pretreatments by corona discharge and electron beam irradiation can be carried out on the non-magnetic support.

The methods to coat over non-magnetic support include air doctor coat, blade coat, rod coat, extrusion coat, air knife coat, squize coat, impregnation coat, reverse coat, gravure coat, transfer roll coat, cast coat, etc. Those other than these methods can be used and simultaneous stratifying coat by extrusion coat may be adopted.

The magnetic recording medium in the present invention can contain an isocyanate hardening agent with more than 2 mean functional groups to increase solvent-resistance. Namely, polymeric compounds of polyisocyanates and polyol adducts of polyisocyanates can be suitably used in the present invention.

Furthermore, introduction of isocyanate produces excellent heat-resistance and durability. Herein, containing isocyanate groups and/or the other isocyanate polymers in polyisocyanate compounds at a certain ratio can introduce the branch point that gelation is not reached in the polyurethane component produced.

As the hardening agents, aromatic polyisocyanates and aliphatic polyisocyanates are mentioned and the adducts of these compounds and active hydrogen compounds are preferable. As the aromatic polyisocyanates, toluene diisocyanate (TDI), 1,3-xylene diisocyanate, 1,4-xylene diisocyanate, 4,4'-diphenylmethane diisocyanate (MDI), p-phenyl diisocyanate, m-phenyl diisocyanate, 1,5-naphthyl diisocyanate, etc. can be listed. Moreover, as the aliphatic polyisocyanate, hexamethylene diisocyanate (HDI), dicyclohexylmethane diisocyanate, cyclohexane diisocyanate, isohoron diisocyanate (IPDI), etc. can be listed. The active hydrogen compounds include ethylene glycol, 1,4-butane diol, 1,3-butane diol, neopentylglycol, diethylene glycol, trimethylpropane, glycerin, etc. and those with the mean molecular weight of 100 to 5,000 are preferable.

The amount of a hardening agent added is generally 0 to 20 weight parts, preferably 0 to 10 weight parts, as the ratio of a binder resin weight. Hereon, theoretically, the hardening agent weight as the isocyanate equivalent to active hydrogen in the polyurethane resin compound (or binding agent compound) is the amount enough to be added. However, because isocyanate in hardening agent reacts with water in actual manufacture, the isocyanate amount equivalent to active hydrogen amount is often insufficient and therefore additing hardening agent at 10 to 50% excessive amount is effective.

Moreover, when using the hardening agent consisting of polyisocyanate, stronger adhesiveness is obtained by accelerating hardening reaction for several hours at 40 to 80° C. after applying magnetic coating.

The present invention can improve the performance of magnetic recording medium such as electromagnetic transducing characteristic and durabilityby using a certain polyurethane resin with alicyclic skeleton, thereby, the magnetic recording medium which can correspond to high density digital recording are supplied.

EXAMPLES

Next, examples and comparisons of the present invention are explained in detail but the present invention is not limited to these. Unless particularly defined, parts and percentages mean (weight parts) and (weight percentages) respectively.

[Example of Synthesis of Material Polyester]

In the vessel with a stirrer, a thermometer and nitrogen-sealed tubes, 5 Mol isophthalic acid, 5 Mol terephthalic acid, 4 Mol 1,4-CHDM and 6 Mol neopentylglycol were mixed and dissolved at 200° C. The catalystic amount of dibutyistannic chloride was added and the material polyester was synthesized by dehydration reaction in the nitrogen atmosphere.

Similarly, various material polyesters with compositions shown in Table 1 to 4 were synthesized.

[Example of Synthesis of Polyurethane Resin]

In the vessel with a stirrer, a thermometer and nitrogen-sealed tubes, 1 Mol phthalate with the molecular weight of 2,000 (composition: isophthalic acid/terephthalic acid=1/1, 1,4-CHDM/neopentylglycol=4/6 (molar ratio), hydroxyl value=56 KOH mg/g) and 1 Mol neopentylglycol (NsG) were mixed to make the amounts of polar groups shown in Table 1, and dissolved in MEK/TOL=1/1 to make 60% solid (weight %). Then, 10 ppm dibutylstannic laurylate added and stirred at 70° C. To this glycol mixture, MDI was added in the amount to make R value (OH mol/NCO mol)=0.95 and serially stirred for 24 hours at 70° C. After the end of reaction, the solid fraction was diluted with MEK/TOL=1/1 to 30% and polyurethane was synthesized.

Similarly, each polyurethane resin sample was synthesized from the material polyesters shown in Table 1 to 4.

Moreover, various quaternary compound-forming agents were added in the amount equivalent to that of polar group, stirred for 20 hours at 60° C. to make polar groups in the polyurethane quaternary ammonium salts.

Then, according to the methods similar to a series of described methods, the polyurethane resins with various amine polar groups were synthesized. The composition of each polyurethane resin are summarized in Table 1 to 4.

TABLE 1

| Polyurethane Composition | | Resin 1 | Resin 2 | Resin 3 | Resin 4 |
|---|---|---|---|---|---|
| Material polyester composition | Dicarboxylic acid components (Composition ratio) | TP/IP 0.5/0.5 | TP/IP 0.5/0.5 | TP/IP 0.5/0.5 | TP/IP 0.5/0.5 |
| | Glycol components (Composition ratio) | 1,4-CHDM/NPG 0.5/0.5 | 1,4-CHDM/NPG 0.5/0.5 | 1,4-CHDM/NPG 0.5/0.5 | 1,4-CHDM/NPG 0.5/0.5 |
| Material polyester (Molar ratio) | | 0.5 | 0.5 | 0.5 | 0.5 |
| Chain propagating agent (Molar ratio) | | NPG 0.5 | NPG 0.5 | NPG 0.5 | NPG 0.5 |
| Diisocyanate (Molar ratio) | | MDI 0.81 | MDI 0.92 | MDI 0.94 | MDI 0.96 |
| Polar group (mmol/g) | | NMDEA (0.1) | NMDEA (0.1) | NMDEA (0.1) | NMDEA (0.1) |
| Molecular weight (GPC) | Mn ($\times 10^4$) | 5,000 | 21,000 | 39,000 | 45,000 |
| | Mw ($\times 10^4$) | 10,200 | 42,000 | 80,000 | 91,000 |

| Polyurethane Composition | | Resin 5 | Resin 6 | Resin 7 |
|---|---|---|---|---|
| Material polyester composition | Dicarboxylic acid components (Composition ratio) | TP/IP 0.5/0.5 | TP/IP 0.4/0.6 | IP/TP/AA 0.3/0.3/0.4 |
| | Glycol components (Composition ratio) | 1,4-CHDM/NPG 0.5/0.5 | 1,2-CHDM/EG 0.4/0.6 | 1,4-CHDM/HG 0.6/0.4 |
| Material polyester (Molar ratio) | | 0.5 | 1.0 | 0.5 |
| Chain propagating agent (Molar ratio) | | NPG 0.5 | NPG 0.5 | BG 0.2 |
| Diisocyanate (Molar ratio) | | MDI 0.76 | TDI 0.94 | HDI 0.95 |
| Polar group (mmol/g) | | NMDEA (0.1) | NMDEA (0.1) | NMDEA (0.1) |

TABLE 1-continued

| | | | | |
|---|---|---|---|---|
| Molecular weight (GPC) | Mn (× 10⁴) | 4,300 | 19,500 | 23,000 |
| | Mw (× 10⁴) | 9,000 | 39,200 | 47,100 |

TABLE 2

| Polyurethane Composition | | Resin 8 | Resin 9 | Resin 10 | Resin 11 |
|---|---|---|---|---|---|
| Material polyester composition | Dicarboxylic acid components (Composition ratio) | TP/IP 0.5/0.5 | TP/IP 0.5/0.5 | TP/IP 0.5/0.5 | TP/IP 0.5/0.5 |
| | Glycol components (Composition ratio) | 1,4-CHDM/NPG 0.5/0.5 | 1,4-CHDM/NPG 0.5/0.5 | 1,4-CHDM/NPG 0.5/0.5 | 1,4-CHDM/NPG 0.5/0.5 |
| Material polyester (Molar ratio) | | 0.5 | 0.5 | 0.5 | 0.5 |
| Chain propagating agent (Molar ratio) | | NPG 0.5 | NPG 0.5 | NPG 0.5 | NPG 0.5 |
| Diisocyanate (Molar ratio) | | MDI 0.81 | MDI 0.92 | MDI 0.94 | MDI 0.96 |
| Polar group (mmol/g) | | NMDEA + TsEt (0.1) | NMDEA + TsEt (0.1) | NMDEA + TsEt (0.1) | NMDEA + TsEt (0.1) |
| Molecular weight (GPC) | Mn (× 10⁴) | 5,500 | 21,800 | 39,400 | 46,200 |
| | Mw (× 10⁴) | 11,200 | 47,000 | 81,000 | 92,000 |

| Polyurethane Composition | | Resin 12 | Resin 13 | Resin 14 |
|---|---|---|---|---|
| Material polyester composition | Dicarboxylic acid components (Composition ratio) | TP/IP 0.5/0.5 | TP/IP 0.4/0.6 | IP/TP/AA 0.3/0.3/0.4 |
| | Glycol components (composition ratio) | 1,4-CHDM/NPG 0.5/0.5 | 1,2-CHDM/EG 0.4/0.6 | 1,4-CHDM/HG 0.6/0.4 |
| Material polyester (Molar ratio) | | 0.5 | 1.0 | 0.5 |
| Chain propagating agent (Molar ratio) | | NPG 0.5 | NPG 0.5 | BG 0.2 |
| Diisocyanate (Molar ratio) | | MDI 0.76 | TDI 0.94 | HDI 0.95 |
| Polar group (mmol/g) | | NMDEA + TsEt (0.1) | NMDEA + TsCl (0.1) | NMDEA + TsCl (0.1) |
| Molecular weight (GPC) | Mn (× 10⁴) | 4,700 | 20,000 | 24,000 |
| | Mw (× 10⁴) | 9,900 | 39,900 | 50,000 |

TsCl = Chloro-p-toluene-sulfonic acid
TsEt = Ethyl p-toluene-sulfonate

TABLE 3

| Polyurethane Composition | | Resin 15 | Resin 16 | Resin 17 | Resin 18 |
|---|---|---|---|---|---|
| Material polyester composition | Dicarboxylic acid components (Composition ratio) | TP/IP 0.5/0.5 | TP/IP 0.5/0.5 | TP/IP 0.5/0.5 | TP/IP 0.5/0.5 |
| | Glycol components (Composition ratio) | 1,4-CHDM/NPG 0.4/0.6 | 1,4-CHDM/NPG 0.4/0.6 | 1,4-CHDM/NPG 0.4/0.6 | 1,4-CHDM/NPG 0.4/0.6 |
| Material polyester (Molar ratio) | | 1.0 | 1.0 | 1.0 | 1.0 |
| Chain propagating agent (Molar ratio) | | none | none | none | none |
| Diisocyanate (Molar ratio) | | MDI 0.95 | MDI 0.95 | MDI 0.95 | MDI 0.95 |
| Polar group (mmol/g) | | none | DEAPD (0.0005) | DEAPD (0.001) | DEAPD (0.05) |
| Molecular weight (GPC) | Mn (× 10⁴) | 21,000 | 20,500 | 20,000 | 19,800 |
| | Mw (× 10⁴) | 42,200 | 41,000 | 41,000 | 40,000 |

| Polyurethane Composition | | Resin 19 | Resin 20 | Resin 21 |
|---|---|---|---|---|
| Material | Dicarboxylic | TP/IP | TP/IP | TP/IP |

TABLE 3-continued

| polyester composition | acid components (Composition ratio) | | 0.5/0.5 | 0.5/0.5 | 0.5/0.5 |
|---|---|---|---|---|---|
| | Glycol components (Composition ratio) | | 1,4-CHDM/NPG 0.4/0.6 | 1,4-CHDM/NPG 0.4/0.6 | 1,4-CHDM/NPG 0.4/0.6 |
| Material polyester (Molar ratio) | | | 1.0 | 1.0 | 1.0 |
| Chain propagating agent (Molar ratio) | | | none | none | none |
| Diisocyanate (Molar ratio) | | | MDI 0.95 | MDI 0.95 | MDI 0.95 |
| Polar group (mmol/g) | | | DEAPD (0.1) | DEAPD (1.0) | DEAPD (1.5) |
| Molecular weight (GPC) | Mn ($\times 10^4$) | | 22,000 | 20,100 | 20,000 |
| | Mw ($\times 10^4$) | | 44,000 | 40,400 | 39,800 |

TABLE 4

| Polyurethane Composition | | Resin 22 | Resin 23 | Resin 24 | Resin 25 |
|---|---|---|---|---|---|
| Material polyester composition | Dicarboxylic acid components (Composition ratio) | AA 1.0 | AA 1.0 | AA 1.0 | AA 1.0 |
| | Glycol components (Composition ratio) | CHDM/NPG 0.5/0.5 | CHDM/NPG 0.5/0.5 | CHDM/NPG 0.5/0.5 | CHDM/NPG 0.5/0.5 |
| Material polyester (Molar ratio) | | 1.0 | 1.0 | 1.0 | 1.0 |
| Chain propagating agent (Molar ratio) | | none | none | none | none |
| Diisocyanate (Molar ratio) | | MDI 0.95 | MDI 0.95 | MDI 0.95 | MDI 0.95 |
| Polar group (mmol/g) | | NMDPA (0.05) | NMDPA + EtBr (0.05) | NMDPA + Tf (0.05) | NMDPA + PO(OEt)$_3$ (0.05) |
| Molecular weight (GPC) | Mn ($\times 10^4$) | 25,000 | 23,000 | 23,000 | 23,000 |
| | Mw ($\times 10^4$) | 51,000 | 46,000 | 45,000 | 45,900 |

| Polyurethane Composition | | Resin 26 | Resin 27 | Resin 28 |
|---|---|---|---|---|
| Material polyester composition | Dicarboxylic acid components (Composition ratio) | TP/IP 0.5/0.5 | TP/IP 0.5/0.5 | AA 1.0 |
| | Glycol components (Composition ratio) | BG/NPG 0.5/0.5 | BG/NPG 0.5/0.5 | HG/NPG 0.2/0.8 |
| Material polyester (Molar ratio) | | 0.5 | 0.5 | 0.5 |
| Chain propagating agent (Molar ratio) | | NPG 0.5 | NPG 0.5 | EG 0.5 |
| Diisocyanate (Molar ratio) | | MDI 0.95 | MDI 0.95 | TDI 0.93 |
| Polar group (mmol/g) | | SO$_3$Na (0.1) | COOH (0.1) | SO$_3$Na (0.2) |
| Molecular weight (GPC) | Mn ($\times 10^4$) | 20,000 | 18,000 | 28,000 |
| | Mw ($\times 10^4$) | 41,200 | 26,100 | 46,100 |

EtBr = Ethyl bromide
Tf = Trifluoroacetic acid
PO(OEt)$_3$ = Triethoxyphosphoric acid The examples of synthesis of polyurethane resins in the above-mentioned tables are outlined by the following chemical formula (2)

Using the polyurethane resins shown in Table 1 to 4, Example 1 to 33 were prepared according to the compositions shown in Table 5 to 7, and the videotapes in the

[Chemical formula (2)]

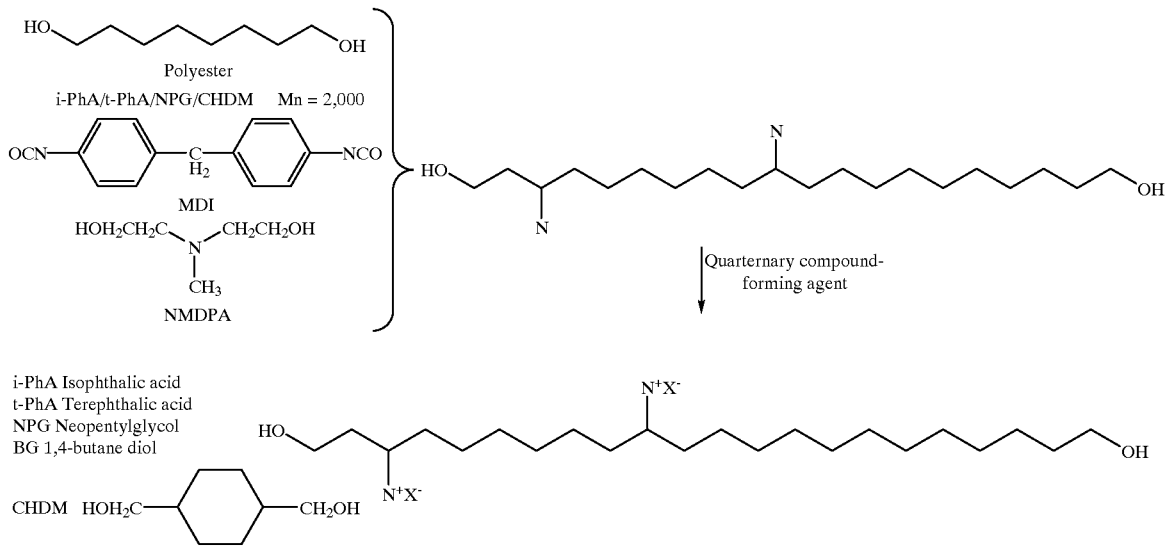

[Molecular Weight Analysis]

Each polyurethene resin was dissolved in THF to make 0.1 wt %, and the molecular weight in terms of polystyrene was measured to determine number average molecular weight (Mn) and weight average molecular weight (Mw)

Next, the magnetic recording medium using these polyurethane resins are presented.

[Example of Preparation of Magnetic Coating]

According to the following composition, the magnetic coating to form magnetic layers was prepared.
<Magnetic Coating Liquid>

The following magnetic coating composition was kneaded with a continuous kneader and dispersed using a sand-mill, to which 4 weight parts of polyisocyanate 1 weight part of myristic acid were added and filtered on the filter in the average pore of 1 am to make magnetic coating.

| Metal magnetic coating powder | 100 parts |
| --- | --- |
| ($\sigma$s = 150 Am$^2$/kg, 56 m$^2$/g, Hc 127 = kA/m) | |
| Vinyl chloride copolymer (MR-110, Nihon Zeon, See Table 5 to 9) | |
| Polyurethane resin (See Table 1 to 4) | 2 parts |
| Carbon Black (BP-L, Cabbot Co., Ltd.) | |
| Alumina (AXP-30, Sumitomo Kagaku) | 5 parts |
| Butyl stearate | 1 part |
| Methylethylketone | 80 parts |
| Methyisobutylketone | 80 parts |
| Toluene | 80 parts |

Dispersed magnetic coating liquid was coated over the polyethylene phthalate film in a thickness of 10 μm using Dycoat to make the thickness of 3.0 μmm. Wide magnetic film obtained was cured and cut in ½ inches to prepared the videotapes.

comparative examples 1 to 20 shown in Table 8 and 9 were prepared according to the magnetic coating compositions similar to those of the examples.

Form these, the dispersibility, magnetostatic property and still-resistance of each example and comparative example prepared were evaluated.

[Dispersibility]

The magnetic coating was coated over each polyethylene terephthalate film (thickness=14.0 μm) and dried, then the glossiness of each coated face was measured at the incident angle of 45° with Digital Deflection Angle Glossimeter VG-ID (Nihon Denshoku Kogyo). Each glossiness was expressed according to the following criteria.

○: Glosiness≧180%

Δ: 150%≦Glosiness<180%

X: Glosiness<150%

[Magnetostatic Properties]

The tapes prepared were measured under the condition of 20° C. and 50% RH using the room temperature magnetometer for very highly vibrating samples (VSM-P10-15 auto, Toei Kogyo Co.,Ltd.).

[Still-resistance]

The tapes were still-reproduced using a Beta cam VTR (BVW-75, Sony) for 60 minutes under the condition of 20° C., 50% RH and evaluated accrding to the following criteria:

○: Running for 120 minutes without head blocking

Δ: Running 120 minutes with blocking

X: Visually, scratches can be found on the surface

[Electromagnetic Transducing Property]

The measurement of electromagnetic transducing property was made using digital beta cam VTR (DVW-500, Sony) at the frequency of 32 MHz and the output difference from the comparative example 1 was measured by defining the output of this example as 0 dB.

The results of evaluation on the items are presented in Table 5 to Table 9.

TABLE 5

| | Experiment No. | Example 1 | Example 2 | Example 3 | Example 4 |
|---|---|---|---|---|---|
| Binder composition | Polyurethane resin No. | 1 | 2 | 2 | 2 |
| | Added amount (weight part) | 10 | 20 | 10 | 6 |
| | MR-110 (weight part) | 10 | 0 | 10 | 14 |
| Glossiness | Gloss (45) | ○ | ○ | ○ | ○ |
| Magnetostatic property | Br (mT) | 246.0 | 260.0 | 264.5 | 251.2 |
| | Rs (%) | 81.9 | 83.0 | 83.6 | 82.7 |
| Electromagnetic transducing property | RF-OUT (dB) | 0.7 | 0.9 | 1.8 | 1.5 |
| | C/N (dB) | 0.3 | 0.5 | 1.0 | 0.7 |
| Durability | Still (min.) | Δ | ○ | ○ | ○ |

| | Experiment No. | Example 5 | Example 6 | Example 7 | Example 8 |
|---|---|---|---|---|---|
| Binder composition | Polyurethane resin No. | 2 | 3 | 6 | 7 |
| | Added amount (weight part) | 1 | 1 | 1 | 1 |
| | MR-110 (weight part) | 19 | 19 | 19 | 19 |
| Glossiness | Gloss (45) | ○ | ○ | ○ | ○ |
| Magnetostatic property | Br (mT) | 231.0 | 250.0 | 244.0 | 260.1 |
| | Rs (%) | 82.1 | 82.1 | 82.9 | 83.0 |
| Electromagnetic transducing property | RF-OUT (dB) | 0.8 | 0.9 | 1.1 | 1.8 |
| | C/N (dB) | 0.3 | 0.4 | 0.5 | 0.8 |
| Durability | Still (min.) | ○ | ○ | ○ | ○ |

| | Experiment No. | Example 9 | Example 10 | Example 11 |
|---|---|---|---|---|
| Binder composition | Polyurethane resin No. | 8 | 9 | 10 |
| | Added amount (weight part) | 1 | 1 | 1 |
| | MR-110 (weight part) | 19 | 19 | 19 |
| Glossiness | Gloss (45) | ○ | ○ | ○ |
| Magnetostatic property | Br (mT) | 250.0 | 264.0 | 250.0 |
| | Rs (%) | 82.0 | 83.9 | 82.3 |
| Electromagnetic transducing property | RF-OUT (dB) | 0.9 | 1.8 | 1.0 |
| | C/N (dB) | 0.4 | 0.9 | 0.5 |
| Durability | Still (min.) | Δ | ○ | ○ |

TABLE 6

| Experiment No. | | Example 12 | Example 13 | Example 14 | Example 15 |
|---|---|---|---|---|---|
| Binder composition | Polyurethane resin No. | 13 | 14 | 17 | 18 |
| | Added amount (weight part) | 10 | 10 | 10 | 10 |
| | MR-110 (weight part) | 10 | 10 | 10 | 10 |
| Glossiness | Gloss (45) | ○ | ○ | Δ | ○ |
| Magnetostatic property | Br (mT) | 249.0 | 262.1 | 236.5 | 249.0 |
| | Rs (%) | 82.9 | 83.1 | 82.1 | 82.9 |
| Electromagnetic transducing property | RF-OUT | 1.2 | 1.9 | 0.4 | 0.8 |
| | C/N (dB) | 0.5 | 1.0 | 0.1 | 0.5 |
| Durability | Still (min.) | ○ | ○ | ○ | ○ |
| Experiment No. | | Example 16 | Example 17 | Example 18 | Example 19 |
| Binder composition | Polyurethane resin No. | 19 | 20 | 22 | 23 |
| | Added amount (weight part) | 10 | 10 | 10 | 10 |
| | MR-110 (weight part) | 10 | 10 | 10 | 10 |
| Glossiness | Gloss (45) | ○ | ○ | ○ | ○ |
| Magnetostatic property | Br (mT) | 261.1 | 253.1 | 249.3 | 256.2 |
| | RS (%) | 83.2 | 82.6 | 82.6 | 82.9 |
| Electromagnetic transducing property | RF-OUT (dB) | 1.6 | 1.2 | 1.0 | 1.1 |
| | C/N (dB) | 0.8 | 0.4 | 0.6 | 0.7 |
| Durability | Still (min.) | ○ | ○ | ○ | ○ |
| Experiment No. | | Example 20 | Example 21 | Example 22 | |
| Binder composition | Polyurethane resin No. | 24 | 25 | 25 | |
| | Added amount (weight part) | 10 | 10 | 5 | |
| | MR-110 (weight part) | 10 | 10 | 15 | |
| Glossiness | Gloss (45) | ○ | ○ | ○ | |
| Magnetostatic property | Br (mT) | 255.4 | 247.8 | 249.6 | |
| | Rs (%) | 82.9 | 81.9 | 82.0 | |
| Electromagnetic transducing property | RF-OUT (dB) | 0.9 | 1.2 | 1.5 | |
| | C/N (dB) | 0.4 | 0.6 | 0.7 | |
| Durability | Still (min.) | ○ | ○ | ○ | |

TABLE 7

| Experiment No. | | Example 23 | Example 24 | Example 25 | Example 26 |
|---|---|---|---|---|---|
| Binder composition | Polyurethane resin No. | 9 | 9 | 9 | 25 |
| | Added amount (weight part) | 20 | 5 | 1 | 15 |
| | MR-110 (weight part) | 0 | 15 | 19 | 3 |
| Glossiness | Gloss (45) | ○ | ○ | ○ | ○ |
| Magnetostatic property | Br (mT) | 266.0 | 259.0 | 231.0 | 248.6 |
| | Rs (%) | 84.1 | 83.0 | 81.0 | 82.6 |
| Electromagnetic transducing property | RF-OUT (dB) | 1.6 | 1.2 | 0.4 | 1.4 |
| | C/N (dB) | 1.0 | 0.6 | 0.2 | 0.7 |
| Durability | Still (min.) | ○ | ○ | Δ | ○ |
| Experiment No. | | Example 27 | Example 28 | Example 29 | Example 30 |
| Binder composition | Polyurethane resin No. | 25 | 10 | 10 | 10 |
| | Added amount (weight part) | 18 | 10 | 15 | 5 |
| | MR-110 (weight part) | 0 | 10* | 5* | 10 + 5* |
| Glossiness | Gloss (45) | ○ | ○ | ○ | ○ |

TABLE 7-continued

| | | | | | |
|---|---|---|---|---|---|
| Magnetostatic property | Br (mT) | 260.1 | 241.0 | 251.1 | 252.2 |
| | RS (%) | 83.1 | 82.3 | 82.7 | 82.6 |
| Electromagnetic transducing property | RF-OUT (dB) | 1.6 | 0.9 | 1.2 | 1.5 |
| | C/N (dB) | 0.8 | 0.4 | 0.5 | 0.7 |
| Durability | Still (min.) | ○ | ○ | ○ | ○ |

| | | Experiment No. | Example 31 | Example 32 | Example 33 |
|---|---|---|---|---|---|
| Binder composition | Polyurethane resin No. | | 15 | 15 | 15 |
| | Added amount (weight part) | | 10 | 15 | 5 |
| | MR-110 (weight part) | | 10* | 5* | 10 + 5* |
| Glossiness | Gloss (45) | | ○ | ○ | ○ |
| Magnetostatic property | Br (mT) | | 234.2 | 244.4 | 251.3 |
| | Rs (%) | | 81.7 | 82.0 | 82.4 |
| Electromagnetic transducing property | RF-OUT (dB) | | 0.6 | 0.9 | 1.1 |
| | C/N (dB) | | 0.2 | 0.4 | 0.4 |
| Durability | Still (min.) | | ○ | ○ | ○ |

*: Nitrocellulose (NC-1/2H, Asahi Kasei)

TABLE 8

| | | Experiment No. | Comparative Example 1 | Comparative Example 2 | Comparative Example 3 |
|---|---|---|---|---|---|
| Binder composition | Polyurethane resin No. | | — | 4 | 5 |
| | Added amount (weight part) | | — | 10 | 10 |
| | MR-110 (weight part) | | 20 | 10 | 10 |
| Glossiness | Gloss (45) | | ○ | Δ | ○ |
| Magnetostatic property | Br (mT) | | 213.0 | 185.0 | 220.0 |
| | Rs (%) | | 80.1 | 78.0 | 80.2 |
| Electromagnetic transducing property | RF-OUT (dB) | | 0.0 | −0.5 | 0.1 |
| | C/N (dB) | | 0.0 | −0.2 | 0.0 |
| Durability | Still (min.) | | Δ | ○ | X |

| | | Experiment No. | Comparative Example 4 | Comparative Example 5 | Comparative Example 6 |
|---|---|---|---|---|---|
| Binder composition | Polyurethane resin No. | | 11 | 12 | 15 |
| Added amount (weight part) | | | 10 | 10 | 10 |
| | MR-110 (weight part) | | 10 | 10 | 10 |
| Glossiness | Gloss (45) | | Δ | ○ | X |
| Magnetostatic property | Br (mT) | | 185.0 | 210.0 | 150.3 |
| | Rs (%) | | 78.1 | 79.8 | 70.6 |
| Electromagnetic transducing property | RF-OUT (dB) | | −0.4 | −0.1 | −3.0 |
| | C/N (dB) | | −0.2 | −0.1 | −2.2 |
| Durability | Still (min.) | | ○ | X | X |

| | | Experiment No. | Comparative Example 7 | Comparative Example 8 | Comparative Example 9 |
|---|---|---|---|---|---|
| Binder composition | Polyurethane resin No. | | 16 | 21 | 26 |
| | Added amount (weight part) | | 10 | 10 | 10 |
| | MR-110 (weight part) | | 10 | 10 | 10 |
| Glossiness | Gloss (45) | | Δ | Δ | X |
| Magnetostatic property | Br (mT) | | 213.0 | 215.9 | 201.2 |
| | Rs (%) | | 80.0 | 80.1 | 78.6 |
| Electromagnetic transducing property | RF-OUT (dB) | | 0.0 | 0.0 | −1.8 |
| | C/N (dB) | | −0.1 | −0.2 | −1.6 |
| Durability | Still (min.) | | Δ | Δ | Δ |

| | Experiment No. | Comparative Example 10 |
|---|---|---|
| Binder composition | Polyurethane resin No. | 27 |

TABLE 8-continued

| | | |
|---|---|---|
| | Added amount (weight part) | 10 |
| | MR-110 (weight part) | 10 |
| Glossiness | Gloss (45) | X |
| Magnetostatic property | Br (mT) | 192.0 |
| | Rs (%) | 77.9 |
| Electromagnetic | RF-OUT (dB) | −0.6 |
| transducing property | C/N (dB) | −0.4 |
| Durability | Still (min.) | Δ |

TABLE 9

| | Experiment No. | Comparative Example 11 | Comparative Example 12 | Comparative Example 13 |
|---|---|---|---|---|
| Binder composition | Polyurethane resin No. | 28 | 2 | 2 |
| | Added amount (weight part) | 10 | 25 | 0.5 |
| | MR-110 (weight part) | 10 | 0 | 19.5 |
| Glossiness | Gloss (45) | ○ | ○ | Δ |
| Magnetostatic property | Br (mT) | 202.0 | 241.0 | 210.0 |
| | Rs (%) | 79.3 | 82.0 | 79.6 |
| Electromagnetic | RF-OUT (dB) | −0.4 | 0.5 | −0.1 |
| transducing property | C/N (dB) | −0.2 | 0.0 | −0.1 |
| Durability | Still (min.) | Δ | X | Δ |

| | Experiment No. | Comparative Example 14 | Comparative Example 15 | Comparative Example 16 |
|---|---|---|---|---|
| Binder composition | Polyurethane resin No. | 9 | 9 | 9 |
| | Added amount (weight part) | 25 | 22 | 0.5 |
| | MR-110 (weight part) | 0 | 0 | 19.5 |
| Glossiness | Gloss (45) | ○ | ○ | Δ |
| Magnetostatic property | Br (mT) | 220.0 | 230.0 | 203.0 |
| | Rs (%) | 81.0 | 81.1 | 79.9 |
| Electromagnetic | RF-OUT (dB) | 0.3 | 0.4 | −0.2 |
| transducing property | C/N (dB) | 0.2 | 0.2 | −0.1 |
| Durability | Still (min.) | X | X | Δ |

| | Experiment No. | Comparative Example 17 | Comparative Example 18 | Comparative Example 19 |
|---|---|---|---|---|
| Binder composition | Polyurethane resin No. | 25 | 25 | 25 |
| | Added amount (weight part) | 25 | 22 | 0.5 |
| | MR-110 (weight part) | 0 | 0 | 19.5 |
| Glossiness | Gloss (45) | ○ | ○0 | Δ |
| Magnetostatic property | Br (mT) | 225.0 | 237.0 | 199.5 |
| | Rs (%) | 81.1 | 81.7 | 79.5 |
| Electromagnetic | RF-OUT (dB) | 0.4 | 0.6 | −0.4 |
| transducing property | C/N (dB) | 0.2 | 0.3 | −0.1 |
| Durability | Still (min.) | X | X | Δ |

| | Experiment No. | Comparative Example 20 |
|---|---|---|
| Binder composition | Polyurethane resin No. | — |
| | Added amount (weight part) | — |
| | MR-110 (weight part) | 10 + 10* |
| Glossiness | Gloss (45) | Δ |
| Magnetostatic property | Br (mT) | 186.2 |
| | Rs (%) | 76.5 |
| Electromagnetic | RF-OUT (dB) | −1.0 |
| transducing property | C/N (dB) | −0.7 |
| Durability | Still (min.) | Δ |

*: Nitrocellulose (NC-1/2H, Asahi Kasei)

The results in Table 5 to Table 9 indicate that high performance magnetic recording medium satisfying any property could be obtained within the scope of claims. Thus, it can be found that high performance videotapes with excellent electromagnetic transdcuing property and excellent durability are available by the present invention.

As described above, the present invention can attempt to improve the dispersibility by using the polyester urethane resins having a certain alicyclic skelton and tertiary amines or quaternary ammonium salts and to improve the productivity by improving handling property in the manufacture as well as to improve the performance of magnetic recording medium such as electromagnetic transducing characteristic and durability. Particularly, the invention can improve the dispersibility and coating property by adjusting a polar group of tertiary amine and quaternary ammonium salt to 0.001 to 1.0 mmol/g, and can effectively suppress occurrence of streaks. Moreover, particularly the invention can suppress increases in the viscosity of the resin solution, increase the solubility and improve the handling property by adjusting the number average molecular weight of the polyurethane resin to 5,000 to 40,000. In addition, the invention can increase the adhesiveness and durability to non-magnetic support by adjusting added amount of the polyurethane resin to 1 to 20 weight parts in terms of ratio of magnetic micropowder weight, and can prevent occurrence of evils due to adhesion during long-term storage.

What is claimed is:

1. A magnetic recording medium produced by coating a dispersion of a magnetic coating material made from magnetic particulates and binder dispersed in a solvent onto a non-magnetic support, wherein said binder is polyester-polyurethane resin containing 0.001 to 1.0 mmol/g of tertiary or quaternary ammonium side chains, and having a diol component with an alicyclic skeleton, as shown in the following chemical formula:

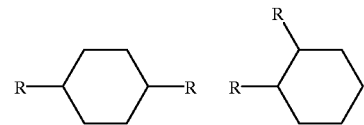

R = hydroxyalkyl, wherein said polyurethane resin has a number-average molecular weight in the range of 5,000 to 40,000 and wherein said polyurethane is contained at 1 to 20 weight parts in terms of the weight ratio of the magnetic particulates.

2. A magnetic recording medium as described in claim 1 wherein said polyurethane resin has a number-average molecular weight of 15,000 to 25,000.

3. A magnetic recording medium as described in claim 1 wherein said polyurethane resin has a number-average molecular weight of 10,000 to 30,000.

* * * * *